Figure 1:
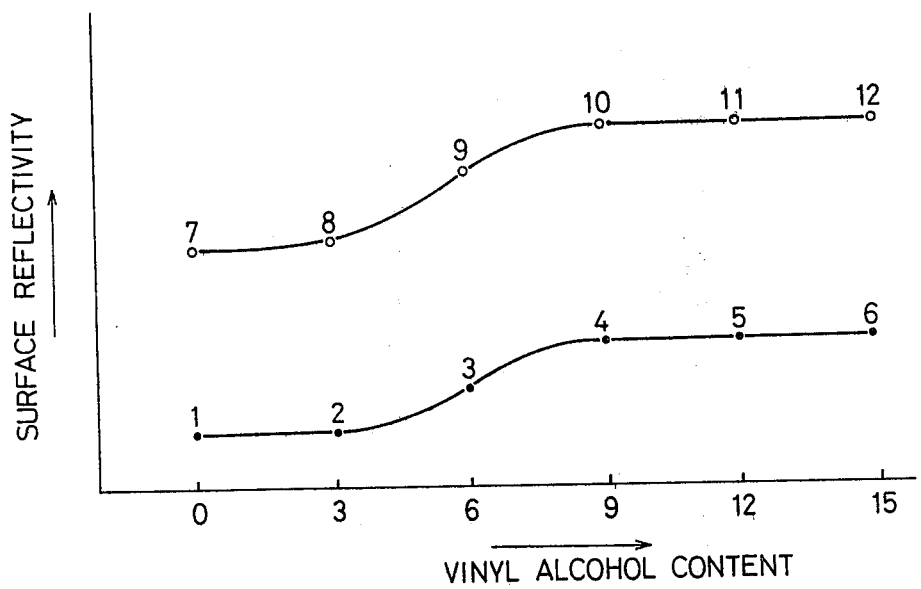

United States Patent [19]
Tokuda et al.

[11] 4,423,115
[45] Dec. 27, 1983

[54] MAGNETIC RECORDING MEDIUM

[75] Inventors: Fuminori Tokuda; Yutaka Nakashima, both of Komoro, Japan

[73] Assignee: TDK Electronics Co., Ltd., Tokyo, Japan

[21] Appl. No.: 421,385

[22] Filed: Sep. 22, 1982

[30] Foreign Application Priority Data

Oct. 23, 1981 [JP] Japan ................................. 56-168727
Oct. 23, 1981 [JP] Japan ................................. 56-168728

[51] Int. Cl.³ ............................................ H01F 10/02
[52] U.S. Cl. .................................. 428/425.9; 428/522; 428/532; 428/694; 428/900
[58] Field of Search ..................... 428/425.9, 522, 532, 428/694, 900

[56] References Cited
U.S. PATENT DOCUMENTS 4,234,438 11/1980 Horigome et al. ............... 252/62.54

Primary Examiner—Bernard D. Pianalto
Attorney, Agent, or Firm—Wyatt, Gerber, Shoup, Scobey & Badie

[57] ABSTRACT

A magnetic recording medium, consisting of a base coated with a magnetic coating material, uses as a binder a polyurethane resin having a metal sulfonate group, a vinyl chloride-vinyl acetate copolymer containing not less than 8% vinyl alcohol on the basis of the total binder weight, and nitrocellulose, in which magnetic particles are dispersed. The binder may contain an isocyanate compound as a crosslinking agent for added particle dispersibility.

6 Claims, 2 Drawing Figures

MAGNETIC RECORDING MEDIUM

This invention relates to a magnetic recording medium, and more specifically to a magnetic recording medium having a magnetic coating of highly dispersed magnetic particles, with excellent surface smoothness and durability.

For magnetic recording tapes, especially for video use, uniform dispersion of magnetic particles throughout the coating layer and a high degree of coating surface smoothness are requisites to high reproduction outputs at short wavelengths and to improved S/N. In addition, the tapes are required to possess adequate physical properties with which to stand repeated usage for long periods of time.

In attempts to meet these requirements, various resin combinations have been proposed for use as binders to yield better magnetic coatings. The proposals have generally proved beneficial for the improvements of physical properties, but the dispersibility and surface smoothness are not beyond being improved yet. Techniques so far introduced to increase the dispersibility of magnetic particles have included the use of a surfactant as dispersing agent and increasing the hydrophilic group (e.g., the OH or COOH group) content in the molecule of the binder resins. The former brings about deterioration and undesired changes with the lapse of time of the physical properties due to the presence of the lower-molecular-weight surfactant in the magnetic coating. The latter achieves some improvements in both the particle dispersibility and the coating surface smoothness but fails to secure thorough dispersion where carbon black or other poorly dispersible substance is present or where a binder resin is used together with a less dispersing resin. Although an increase in dispersibility is usually accompanied with an improvement in surface smoothness, a poor-dispersant resin may be combined with a larger volume of a softer resin to provide a coating which can be smoothened on the surface by calendering or other finish to lower the modulation noise of the product medium. However, the finish cannot suppress the noise that would arise from insufficient particle dispersion. Moreover, the copious use of a soft resin is undesirable since it makes the magnetic coating susceptible to friction, with a penalty of durability and other desired properties.

The present invention is aimed at providing a magnetic recording medium which eliminates the foregoing difficulties, achieves excellent particle dispersion, and has a magnetic coating with very smooth surface and good durability.

After extensive investigations and experiments, the present inventors have now found that, by use of a magnetic coating material which comprises as binder components a special polyurethane resin with outstanding dispersibility, a vinyl chloride-vinyl acetate copolymer with improved dispersibility, and nitrocellulose, a magnetic recording medium can be provided which has a magnetic coating superior in dispersion, stability, surface smoothness, and durability in service. It has also been found that crosslinking of these binder components with a polyisocyanate compound will further improve the running durability of the product medium.

The polyurethane resin to be used in the present invention is one containing generally a metal sulfonate group, preferably sodium sulfonate group (hereinafter called the —$SO_3Na$ group). Having the —$SO_3Na$ group as a side chain, the resin enables the binder to achieve the same effect as by the addition of a dispersing agent, without the drawbacks that would result from the use of the low-molecular-weight dispersant.

One of the present inventors previously proposed, in copending Japanese Patent Application No. 132343/1980, a magnetic recording medium using a sodium sulfonate group-containing polyurethane resin or the like. The invention permitted the polyurethane resin or the like to have a strikingly improved dispersing action. However, the dispersibility tends to be affected rather adversely when the resin is used together with another resin to modify the physical properties of the resulting magnetic recording medium.

After a further intensive search for a binder composition free from the aforesaid disadvantages, the present inventors succeeded in obtaining a magnetic recording medium with very good dispersion and surface smoothness and outstanding running durability by combining the abovementioned polyurethane resin of the improved type with a vinyl chloride-vinyl acetate copolymer containing not less than 8% by weight of vinyl alcohol on the basis of the total copolymer weight. Nevertheless, further studies revealed that the binder components for the magnetic recording medium, when mixed and dispersed with the magnetic particles, solvent, and other additives into a coating material, tend to separate from the solvent; the coating material must be applied on the base as soon as it is prepared, instead of being allowed to stand. In view of this, additional investigations were made to find a way of maintaining the desirable physical properties, such as dispersibility and surface smoothness, and improving the stability of the coating material without employing a low-molecular-weight substance. Finally, a magnetic recording medium with excellent coating material stability has now been obtained by adding nitrocellulose to the binder composition referred to immediately above.

The —$SO_3Na$-containing polyurethane resin to be employed in the present invention is prepared by polycondensation of a dicarboxylic acid ingredient (terephthalic, isophthalic, sebacic, or other similar acid), a polyhydric alcohol ingredient (ethylene, glycol, neopentyl glycol, etc.), and a —$SO_3Na$-containing dicarboxylic acid ingredient (sodium 5-sulfoisophthalate, etc.) and then by urethanizing the resulting polyester resin with diphenylmethane 4,4'-diisocyanate (MDI). Where necessary, one of varied combinations of dicarboxylic acids and polyhydric alcohols may be employed as the ingredients productive of a desired polyester resin. The isocyanate ingredient to be reacted with the polyester resin may be chosen from among various diisocyanate compounds, e.g., hexamethylene diisocyanate (HMDI), toluene diisocyanate (TDI), 1,5-naphthalene diisocyanate (NDI), tolidine diisocyanate (TODI), and lysine diisocyanate methyl ester (LDI).

The vinyl chloride-vinyl acetate copolymer to be used in the present invention contains not less than 8% vinyl alcohol (on the basis of the total copolymer weight) as compared with the usual content of about 0–4% in ordinary copolymers of the character. The hydrophilic —OH group in the vinyl alcohol coacts with the (also hydrophilic) magnetic particle surfaces to provide good wettability and hence improved dispersibility. (The —$SO_3Na$ group in the polyurethane resin according to the invention acts even better.) However, in an amount of 0.5% the vinyl alcohol gives almost no such effect. Exceeding 6%, it begins to prove effective.

The effect reaches a maximum with about 8% and remains saturated beyond that percentage. The vinyl chloride-vinyl acetate copolymer that contains not less than 8% vinyl alcohol exhibits very good dispersibility as such, but it is only by use of the copolymer in combination with the highly dispersible resin according to the invention that such an excellently dispersible binder for magnetic recording medium that has never been available heretofore can be obtained.

The nitrocellulose used in Examples of the invention to be given later, in order to improve the stability of the magnetic coating compositions was the one marketed under the trade designation "H-½ Second".

The combination of the polyurethane resin, vinyl chloride-vinyl acetate copolymer, and nitrocellulose gives a binder which, in turn, can impart the resulting magnetic recording medium with excellent running durability and other physical properties. However, the combination has been found incapable of conferring sufficient durability on the magnetic recording medium in the high temperature range (40°–50° C.) of the ambient temperature that the medium is likely to encounter in use. The present invention has eliminated this shortcoming by using an isocyanate compound and cross-linking the whole mixture, and has successfully provided a magnetic recording medium excellent in particle dispersibility, surface smoothness, and durability. Useful isocyanate compounds for the invention are the compounds having two or more isocyanate groups or their adducts (including the adducts of dimers and trimers, and adducts with dihydric and trihydric alcohols).

Examples of the magnetic powders usable in practicing the invention are the particles of γ-iron oxide, cobalt-coated γ-iron oxide, cobalt-doped γ-iron oxide, $CrO_2$, magnetic alloys, and magnetic metals.

According to the necessity, an antistatic agent, carbon black, lubricant, nonmagnetic inorganic pigment, and/or the like may be added to the composition of the invention.

The invention will be better understood by reading the following Examples thereof in conjunction with the accompanying drawing, wherein:

BRIEF AND DETAILED DESCRIPTION OF THE DRAWINGS

Figure 2:
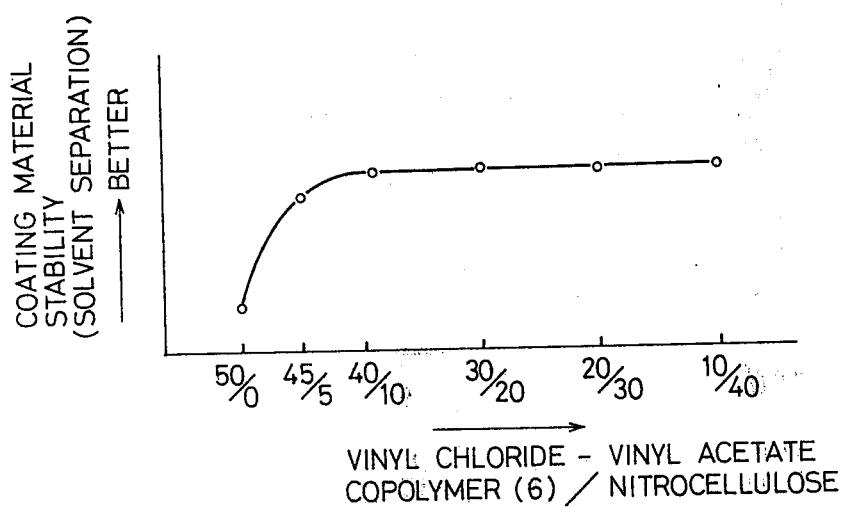

FIG. 1 is a graph showing the effects of the vinyl alcohol content in the vinyl chloride-vinyl acetate copolymer and the sodium sulfonate group in the polyurethane resin, respectively, upon the surface reflectance of the resulting magnetic recording medium; and FIG. 2 is a graph showing the effect of nitrocellulose upon the stability of the coating material.

The resins employed in the Examples were of compositions tabulated below.

|  | Polyurethane resins | |
|---|---|---|
|  | —SO₃Na—contg. polyurethane resin* | Non-SO₃Na—contg. polyurethane resin* |
| Terephthalic acid | 15 mol % | 15 mol % |
| Sebacic acid | 30 mol % | 30 mol % |
| Sodium 5-sulfoisophthalic acid | 5 mol % | — |
| Isophthalic acid | — | 5 mol % |
| Ethylene glycol | 20 mol % | 20 mol % |
| Neopentyl glycol | 30 mol % | 30 mol % |

*Polyurethane resins having a molecular weight of about 20000 prepared by reacting each polyester resin of the above composition and having a molecular weight of about 2000 with MDI.

|  | Vinyl chloride-vinyl acetate copolymers | | | | | |
|---|---|---|---|---|---|---|
|  | Vinyl chloride-vinyl acetate copolymer | | | | | |
| Ingredient, wt % | (1) | (2) | (3) | (4) | (5) | (6) |
| Vinyl chloride | 97 | 94 | 91 | 88 | 85 | 82 |
| Vinyl alcohol | 0 | 3 | 6 | 9 | 12 | 15 |
| Vinyl acetate | 3 | 3 | 3 | 3 | 3 | 3 |

EXAMPLE 1

TABLE 1

|  | Specimen | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| Non-SO₃Na—contg. polyurethane resin | 0 | 0 | 0 | 0 | 0 | 0 |  |  |  |  |  |  |
| —SO₃Na—contg. polyurethane resin |  |  |  |  |  |  | 0 | 0 | 0 | 0 | 0 | 0 |
| Vinyl chloride-vinyl acetate copolymer (1) | 0 |  |  |  |  |  | 0 |  |  |  |  |  |
| Vinyl chloride-vinyl acetate copolymer (2) |  | 0 |  |  |  |  |  | 0 |  |  |  |  |
| Vinyl chloride-vinyl acetate copolymer (3) |  |  | 0 |  |  |  |  |  | 0 |  |  |  |
| Vinyl chloride-vinyl acetate copolymer (4) |  |  |  | 0 |  |  |  |  |  | 0 |  |  |
| Vinyl chloride-vinyl acetate copolymer (5) |  |  |  |  | 0 |  |  |  |  |  | 0 |  |
| Vinyl chloride-vinyl acetate copolymer (6) |  |  |  |  |  | 0 |  |  |  |  |  | 0 |

Using the combinations of resins given in Table 1, each mixture of the composition consisting of

| cobalt-coated γ-Fe₂O₃ | 400 parts by wt. |
|---|---|
| polyurethane resin (according to Table 1) | 50 parts by wt. |
| vinyl chloride-vinyl acetate copolymer | 30 parts by wt. |

-continued (according to Table 1)
| | |
|---|---|
| nitrocellulose | 20 parts by wt. |
| carbon black | 30 parts by wt. |
| lubricant | 10 parts by wt. |
| nonmagnetic inorganic pigment | 20 parts by wt. |
| methyl ethyl ketone | 400 parts by wt. |
| toluene | 400 parts by wt. | was thoroughly dispersed in the usual manner, and the mixture was applied on a base of polyethylene terephthalate to form a coat which would be 5 μm thick when dry, and was dried.

The magnetic coatings of the magnetic recording medium thus obtained were tested for their surface reflexibilities. The results are graphically represented in FIG. 1. Numerals 1 to 12 on the curves correspond to the numbers of specimens. The upper curve represents the results of specimens using the —$SO_3Na$-containing coating materials and the lower curve the results of those using the —$SO_3Na$-free materials. The reflectivity is the value determined of the coating surface before calendering. It is an appropriate index of the particle dispersibility in the coating and is also suggestive of good surface quality of the calendered coating.

As can be seen from the graph, the —$SO_3Na$ group contained in the polyurethane resin markedly improves the surface smoothness of the magnetic recording medium. Also, the vinyl alcohol content of the vinyl chloride-vinyl acetate copolymer, when adjusted to over 6%, will make the surface smoother. The content of about 8% will achieve a further, notable improvement, but beyond about 8%, the smoothening effect will be saturated.

The magnetic recording medium made in this way was then calendered for a mirror finish of the magnetic coating surface, and was slitted into ribbons of a predetermined width to obtain magnetic recording tapes. Each tape was tested by repeated one-hundred runs (back and forth from hub to hub past VTR playback heads). All the tapes performed well, showing nothing to be desired.

As will be obvious from the foregoing, the magnetic recording medium that uses as binder components a —$SO_3Na$-containing polyurethane resin, a vinyl chloride-vinyl acetate copolymer containing not less than 8% vinyl alcohol on the basis of the copolymer weight, and nitrocellulose is excellent in dispersibility and surface smoothness and, besides, possesses great durability.

EXAMPLE 2

Of the compositions given in Table 1, that of Specimen 12 was employed, and the ratio of the vinyl chloride-vinyl acetate copolymer (6) to nitrocellulose was varied while the polyurethane resin was kept at a constant amount of 50 parts by weight. The resulting coating compositions were used in preparing different specimens of magnetic recording medium. The specimens were tested for their coating material stability (solvent separability), and the results shown in FIG. 2 were obtained. In the graph the ratio 20/30 gives the test result with Specimen 12. The coating material stability was evaluated by placing a test material in a settling tube, allowing it to stand for 24 hours, and then seeing whether the solvent has separated from the rest of the composition. With the composition having the ratio of 40/10, no such separation was observed.

The results indicate that the presence of nitrocellulose, in an amount of not less than 5%, will impart a good stability to the coating material. When magnetic recording tapes were made in the same way as with Specimens 1 to 12, it was found that more than 40% nitrocellulose would unfavorably affect the calenderability and surface quality of the coated surface.

EXAMPLE 3

Twenty parts by weight of "Desmodur L" (the trade designation of an isocyanate compound marketed by Bayer AG) was added to the coating composition of Specimen 12, one of the best compositions in the group of Specimens 1 to 12 in Example 1. The mixture was applied, dried, and the resulting coating layer was calendered by the same process and method as used with the 12 specimens. The calendered coating was cured by a heat treatment at a predetermined temperature, and the medium was slitted into a ribbon of a suitable width to obtain a magnetic recording tape (hereinafter called the "example tape"). On the other hand, the magnetic recording medium of Specimen 12 was calendered directly and slitted likewise to a tape form (hereinafter called the "comparative tape"). Comparative tests gave results as shown in Table 2.

TABLE 2

| | Comparative tape | Example tape |
|---|---|---|
| Surface quality | Equal | |
| At 20° C. | 150–200 runs choked the heads. | 300 runs were performed satisfactorily. |
| At 40° C. | 100–150 runs choked the heads. | 300 runs were performed satisfactorily. |

The results demonstrate that the magnetic recording medium made by using the —$SO_3Na$-containing polyurethane resin, vinyl chloride-vinyl acetate copolymer containing not less than 8% vinyl alcohol, and nitrocellulose as the binder components and the isocyanate compound as a crosslinking agent is further improved in durability.

What is claimed is:

1. A magnetic recording medium comprising a base and a magnetic coating material applied thereon, said coating being made of a binder which consists of a polyurethane resin having a metal sulfonate group, a vinyl chloride-vinyl acetate copolymer containing not less than 8% vinyl alcohol on the basis of the total copolymer weight, and nitrocellulose, and magnetic particles dispersed in said binder.

2. A magnetic recording medium according to claim 1 wherein said metal sulfonate group is —$SO_3Na$.

3. A magnetic recording medium according to claim 1 or 2 wherein said nitrocellulose is contained in an amount of not less than 5% by weight on the basis of the binder weight.

4. A magnetic recording medium comprising a base and a magnetic coating material applied thereon, said coating being made of a binder which consists of a polyurethane resin having a metal sulfonate group, a vinyl chloride-vinyl acetate copolymer containing not less than 8% vinyl alcohol on the basis of the total copolymer weight, and nitrocellulose, said binder containing an isocyanate compound as a crosslinking agent, and magnetic particles dispersed in said binder.

5. A magnetic recording medium according to claim 4 wherein said metal sulfonate group is —$SO_3Na$.

6. A magnetic recording medium according to claim 4 or 5 wherein said nitrocellulose is contained in an amount of not less than 5% by weight on the basis of the binder weight.

* * * * *